United States Patent [19]
Spies

[11] Patent Number: 5,841,275
[45] Date of Patent: Nov. 24, 1998

[54] MAGNETIC MEASURING SYSTEM HAVING A PARTICULARLY ORIENTED AUXILIARY FIELD

[75] Inventor: Alfons Spies, Seebruck, Germany

[73] Assignee: Johannes Heidenhain GmbH, Traunreut, Germany

[21] Appl. No.: 410,321

[22] Filed: Mar. 24, 1995

[30] Foreign Application Priority Data

Mar. 25, 1994 [EP] European Pat. Off. ............... 94104762
Mar. 25, 1994 [EP] European Pat. Off. ............... 95104763

[51] Int. Cl.⁶ .............................. G01B 7/14; G01B 7/00; G01D 5/245
[52] U.S. Cl. ............................. 324/267.21; 324/207.24; 324/235; 324/207.12
[58] Field of Search .................. 324/207.21, 207.24, 324/207.25, 235, 252, 207.12; 338/32 R

[56] References Cited

U.S. PATENT DOCUMENTS

| | | | |
|---|---|---|---|
| 3,493,694 | 2/1970 | Hunt | 324/252 |
| 4,079,360 | 3/1978 | Ookubo et al. | |
| 4,361,805 | 11/1982 | Narimatsu et al. | |
| 4,523,243 | 6/1985 | Billington | 324/252 |
| 4,596,950 | 6/1986 | Lienhard et al. | |
| 4,649,342 | 3/1987 | Nakamura | |
| 4,703,378 | 10/1987 | Imakoshi et al. | |
| 4,725,776 | 2/1988 | Onodera et al. | |
| 4,754,221 | 6/1988 | Ao et al. | |
| 4,806,860 | 2/1989 | Iijima et al. | |
| 4,909,560 | 3/1990 | Ginn | 324/207.2 |
| 4,930,096 | 5/1990 | Shimizu et al. | 702/162 |
| 5,021,736 | 6/1991 | Gunsalves et al. | |
| 5,243,280 | 9/1993 | Kusumi | |

FOREIGN PATENT DOCUMENTS

| | | |
|---|---|---|
| 0 069 392 | 7/1982 | European Pat. Off. |
| 04 21 489 | 4/1991 | European Pat. Off. |
| WO94/15223 | 7/1994 | European Pat. Off. |
| 2 452 716 | 10/1980 | France |
| 2 597 529 | 10/1987 | France |
| 28 34 519 | 7/1980 | Germany |
| 3 422 328 | 12/1984 | Germany |
| 41 29 576 | 3/1993 | Germany |
| 43 06 634 | 9/1993 | Germany |

OTHER PUBLICATIONS

Reuber, C., "Jüngere Ideen Für Magneto–Sensoren," Messen Prüfer Automatisieren, Jul./Aug. 1985. pp. 354–355.
Reiniger, Günter, "Drehwinkelmessung mit Magnet–feldsensoren," Elektronik, Nov. 14, 1986, pp. 129–136.
Nelson, T.J. et al., "Shear–Sensitive Magneto–resistive Robotic Tactile Sensor," 1986 Digests of Intermag '86 International Magnetics Conference Apr. 14–17, one page.
Patent Abstracts of Japan, Publication No. JP 56122912, published Sep. 26, 1981, one page.
Patent Abstracts of Japan, Publication No. JP 3131717, published Jun. 5, 1991, one page.
Patent Abstracts of Japan, Publication No. JP 56118612, published Sep. 17, 1981, one page.

*Primary Examiner*—Walter Snow
*Attorney, Agent, or Firm*—Brinks Hofer Gilson & Lione

[57] ABSTRACT

A position measuring device having a magnetic graduation scanned by a scanner unit which contains magnetic field sensitive elements as sensors. A high frequency alternating auxiliary field is generated to magnetically bias the magnetic field sensitive elements.

23 Claims, 10 Drawing Sheets

MAGNETIC MEASURING SYSTEM HAVING A PARTICULARLY ORIENTED AUXILIARY FIELD

FIELD OF THE INVENTION

The invention relates to a position measuring system for measuring the relative position of two objects which are movable with respect to each other, and more particularly to a position measuring system wherein a periodic graduation in the form of a magnetic record medium having a magnetization pattern recorded thereon is scanned in the measuring direction by a scanning unit having at least one magneto-resistive element for generating position-dependent output signals from which position measurement values can be determined in an evaluation device wherein an auxiliary high frequency alternating field biases the magnetoresistive element.

BACKGROUND OF THE INVENTION

German Patent Publication DE 28 34 519 A1 discloses a digital linear measuring device having two parts which are displaceable with respect to each other, one of which supports a scale and the other a detector for scanning the scale and for generating electrical signals which correspond to the scanned length of the scale. An electronic device processes the detector signals. The scale has a marking support with material which can be magnetized and is magnetized at predefined distances to form readable markings. The detector includes a reading head for reading the markings of the scale. A digital display device can be used for performing further processing. The marking support can be a magnetic layer with the markings formed by sinusoidal magnetization of two tracks and a reading head being respectively provided for each track. The detector can have at least one magnetic head sensitive to flux which is connected between the detector and the marking support in accordance with the principle of a magnetic modulator for reading at low relative speed. Detailed information regarding the embodiment of the detector is absent in the mentioned reference.

European Patent Publication EP 0 069 392 A2 discloses a digital position measuring device wherein a detector having a magneto-resistive sensor is provided. Magneto-resistive sensors with different characteristic curves are described therein and bridge circuits having such sensors are disclosed. It is thus desirable to provide a scanning unit which has a magnetic field sensitive sensor for a position measuring device, which unit is not sensitive to disruptive external fields, compensates for zero displacements of the sensors, and generates few harmonic components.

SUMMARY OF THE INVENTION

According to a first aspect of the present invention, a portion measuring device for measuring the relative position of two objects which are movable with respect to each other is provided. A scale having a periodic graduation formed by magnetizing a pattern on the scale is scanned in a measuring direction by a scanning unit. The scanning unit has at least one magnetic field sensitive element for generating position dependent output signals from which position measurement values can be determined in an evaluation device, the magnetic field sensitive element disposed in a plane parallel to the periodic graduation, the magnetic field sensitive element having a saturation point. Also provided is an auxiliary magnetic field generator to magnetically bias the magnetic field generator to magnetically bias the magnetic field sensitive element. The auxiliary magnetic field generator generating a high frequency alternating field.

According to a second aspect of the present inventor, a position measuring device for measuring the relative position of two objects which can be moved in relation to each other wherein a periodic, magnetic graduator is scanned by a scanner unit having at least one magnetic field sensitive element for generating position—dependent output signals from which position measuring the values can be determined in an evaluation device. At least one magnetic field sensitive element is disposed in a plane parallel to the graduation. Means are provided for momentarily rendering the magnetic field of the graduation ineffective.

An advantage of the position measuring device according to the present invention is its functional reliability in the stabilization of the operating point of the magnetic field sensitive elements inside its characteristic curve, and in the favorable properties resulting therefrom.

The invention itself, together with further objects and attendant advantages, will best be understood by reference to the following detailed description, taken in conjunction with the accompanying drawings.

DESCRIPTION OF THE PRESENTLY PREFERRED EMBODIMENTS

Figure 1A:
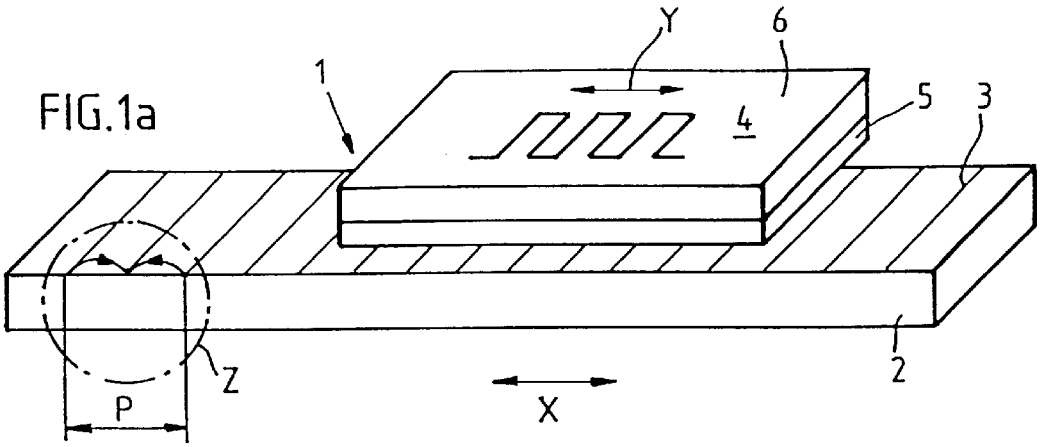
FIG. 1a is a perspective view of a position measuring device according to a preferred embodiment of the present invention.

FIG. 1a is a perspective view of a position measuring device according to a preferred embodiment of the present invention. The position measuring device is preferably a magnetic linear measuring device 1 which includes a scale 2 and a scanning unit 4. The scale 2 is preferably mounted on a first object such as a workpiece and the scanning unit 4 is mounted on a second object such as a machine tool, for example, the first and second objects being movable with respect to each other along the displacement direction X. While the position measuring device shown in FIG. 1 is directed to measuring linear displacements, the present invention can also be employed with angular position measuring devices.

In a preferred embodiment, the scale 2 is formed of a magnetic record medium and it has a magnetization pattern recorded preferably on its surface in the direction of displacement X. The magnetic pattern recorded on the scale 2 forms a periodic graduation 3 having a series of magnetized strips alternately arranged with opposite field strength to create a graduation 3 with graduation period P. Magnetization preferably takes place along the plane in which the scale 2 extends but it can also extend vertically thereto.

The scanning unit 4 includes at least one magneto-resistive element 5 mounted on a scanning plate (not shown) for scanning the periodic graduation 3 of the scale 2 and a module 6 for generating an auxiliary magnetic field Y. The magneto-resistive elements will be described in detail hereinafter with reference to the remaining Figures.

The module 6 of the scanning unit 4 generates an auxiliary magnetic field Y preferably parallel to the displacement direction X and parallel with the plane of scale 2. The auxiliary magnetic field Y is an alternating field which can be generated either electro-magnetically or through the use of permanent magnets. In a preferred embodiment the auxiliary magnetic field is a high frequency alternating field.

Figure 1B:
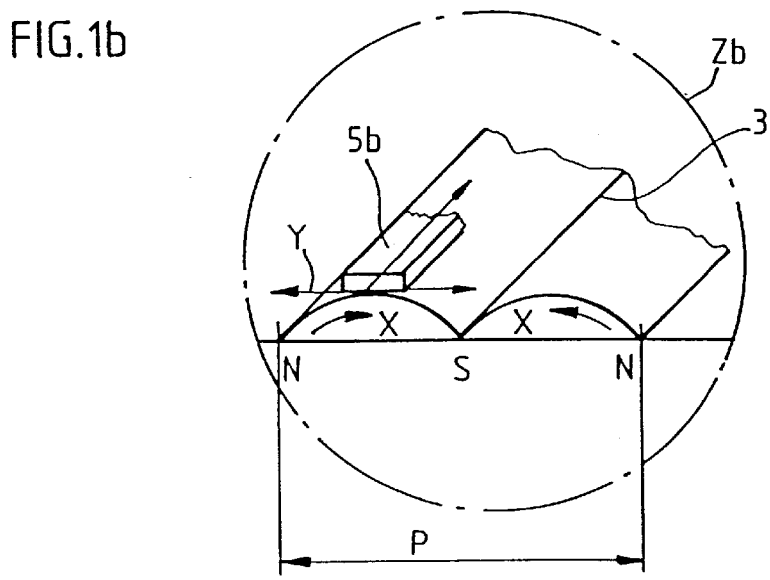
FIG. 1b is an exploded view of a section of the scale shown in FIG. 1a with a magneto-resistive element positioned thereabove according to a first preferred embodiment of the present invention.

FIG. 1b is an exploded view of a section of the scale shown in FIG. 1a with a magneto-resistive element X positioned thereabove according to a first preferred embodiment of the present invention. The magnetization of scale 2 generates a stray field which is symbolically illustrated by the curved arrows pointing from the North field strips to the South field strips. Because the magneto-resistive elements 5 are sensitive to the stray field, the effect of the stray field on the magneto-resistive elements 5 must be compensated for otherwise inaccuracies will result in the measurement values obtained. The auxiliary field Y is generated to provide such compensation. The magneto-resistive element 5b is disposed horizontally in a plane parallel to the graduation 3. The auxiliary field Y acts perpendicularly to the lengthwise extension of the sensor in this case parallel to a component of this stray field caused by the magnetization of scale 2 and in a plane parallel to the scale 2.

Figure 1C:
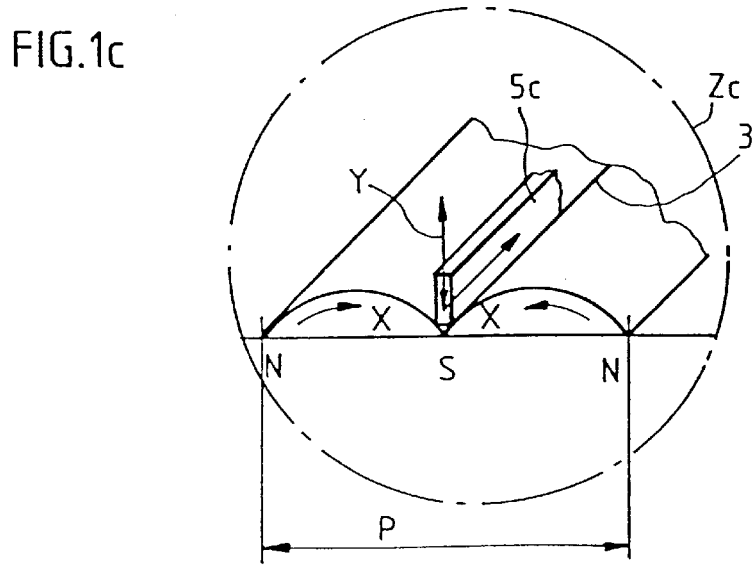
FIG. 1c is an exploded view of a section of the sale shown in FIG. 1a with a magneto-resistive element positioned thereabove according to a second preferred embodiment of the present invention.

FIG. 1c is an exploded view of a section of the scale shown in FIG. 1a with a magneto-resistive element positioned thereabove according to a second preferred embodiment of the present invention. In this embodiment, the magneto-resistive element 5c is vertically positioned in a plane parallel to the graduation 2. The auxiliary field Y acts perpendicularly to the lengthwise extension of the sensor, or, in this case, perpendicularly to a component of the stray field generated by the scale 2 and in a plane parallel to the scale 2.

Any magnetic field sensitive sensor with a quadratic characteristic curve may be used for the magneto-resistive element of the present invention. Thus, flux-controlled resistors can also be used as magneto-resistive elements. The auxiliary field according to the present invention must lie only in the direction in which the sensor is more sensitive.

Figure 2:
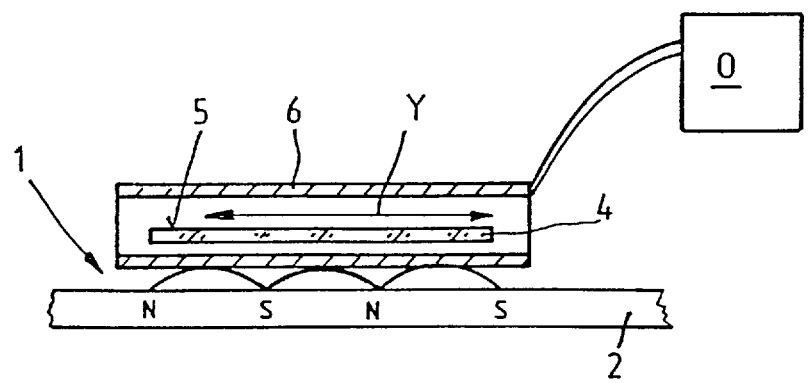
FIG. 2 illustrates a position measuring device having a magnetic auxiliary field.

FIG. 2 illustrates a cross-section of a position measuring device according to another preferred embodiment of the present invention. A coil 6 encompassing the magneto-resistive elements 5 is used to generate the auxiliary field Y. The scale 2 is scanned by a scanner unit 4 which has the magneto-resistive elements 5, or sensors, encompassed by the coil 6.

The coil 6 generates an auxiliary field Y which lies in the plane of the sensors 5 and runs perpendicular to the longitudinal span of the sensors 5 (see FIG. 1b). The coil 6 is powered by an oscillator O with a high frequency alternating current preferably in the range of 20 to 500 KHZ. In a preferred embodiment, the oscillator is disposed in the scanning unit.

If the coil 6 is powered with a rectangular alternating current, then the auxiliary field Y, which overlaps the scale field X, likewise has a rectangular progression. (see FIG. 1a).

Figure 3:
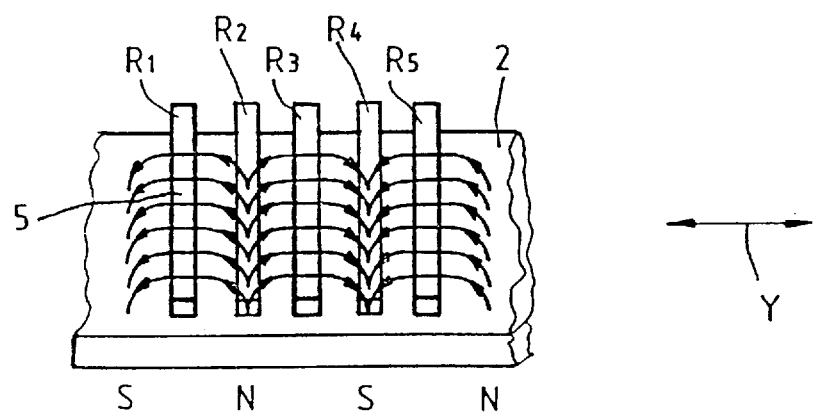
FIG. 3 shows a schematic representation of scale, scanning elements, and auxiliary field.

In FIG. 3, the position of the sensor indicated as Ri where i=1 . . . n to the magnetic scale 2 is roughly indicated as is the direction of the auxiliary field.

Figure 4:
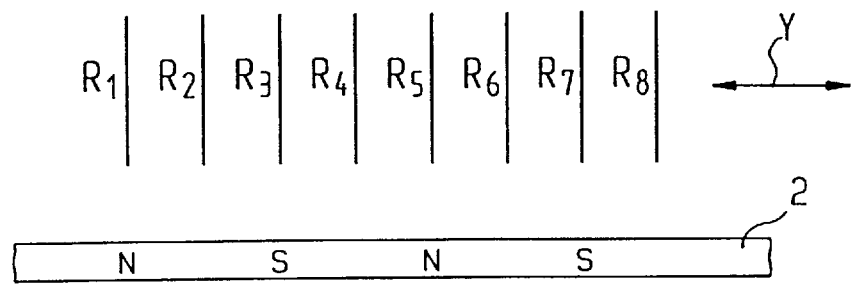
FIG. 4 shows a schematic arrangement of magneto-resistive elements of FIG. 3.

FIG. 4 shows the further schematic representation of a device according to FIG. 3. The sensors, as electric equivalent resistors Ri (i=1 . . . n), are shown over the scale 2, in order to transfer to the equivalent circuit diagram having two full bridge circuits according to FIG. 5.

Figure 5:
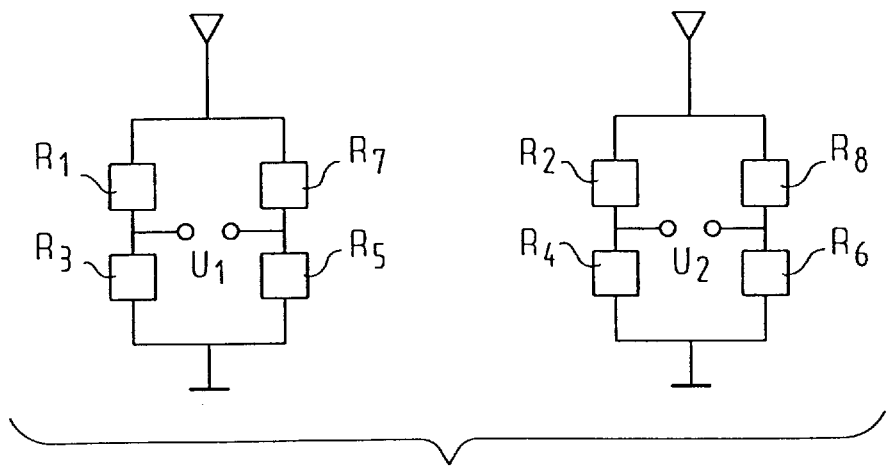
FIG. 5 shows a further arrangement of magneto-resistive elements in a bridge circuit.

FIG. 5 shows the interconnection of the sensors Ri to form two full bridge circuits. The bridges are powered with constant current or constant voltage. Two amplitude-modulated signals U1 and U2 are generated at the outputs of the bridges, the amplitude-modulated signals U1 and U2 having the frequency with which the coil 6 is powered.

Figure 6:
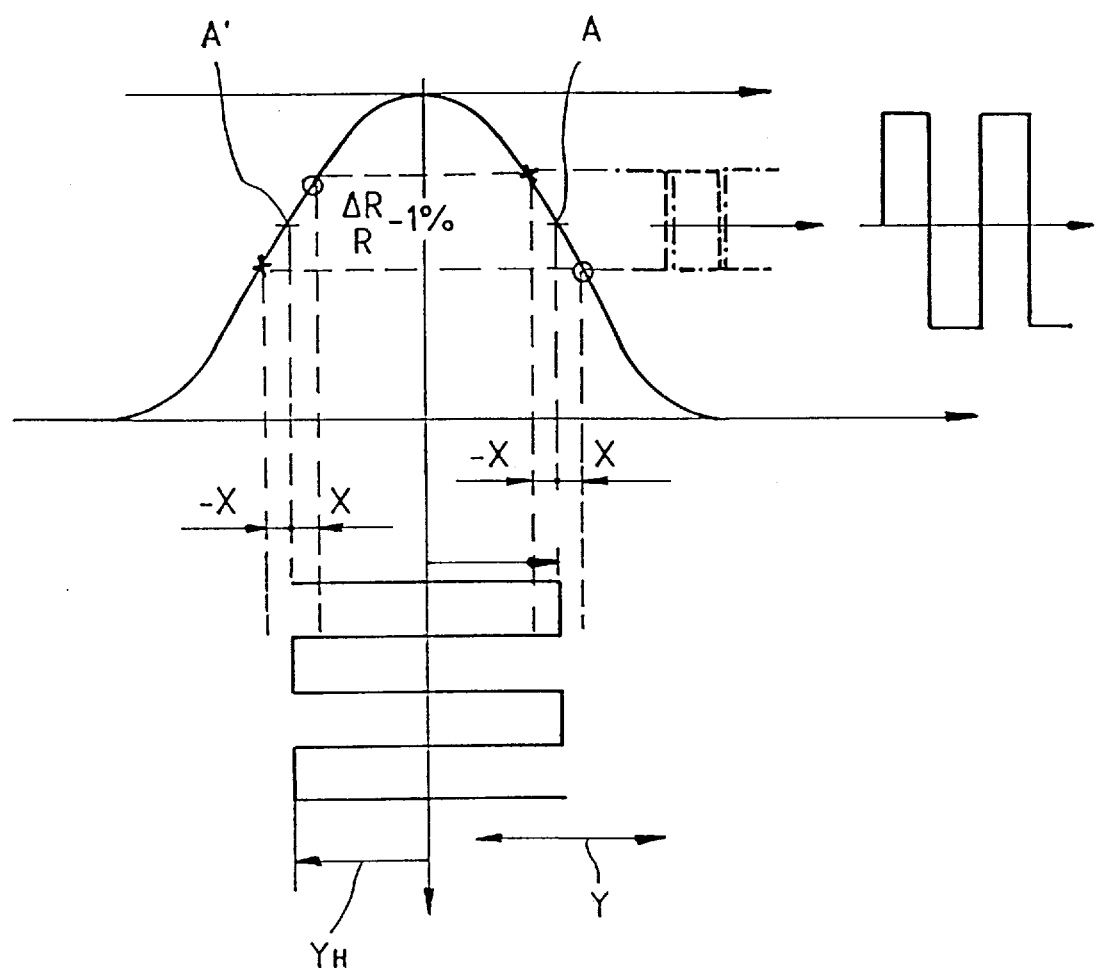
FIG. 6 shows a characteristic curve of a magneto-resistive element having signal progression when modulating with a rectangular auxiliary field.

The generation of an amplitude-modulated signal U1 or U2 is shown in FIG. 6 for a half bridge of FIG. 5.

The auxiliary field Y has the amplitude $Y_H$, as shown in the lower part of FIG. 6. The sensor 5 has a bell shaped sensitivity curve as illustrated. It is an objective of the present invention to cause the sensor 5 to operate in the linear portion of its sensitivity curve, i.e., between the points marked with a circle and a cross. The auxiliary field Y controls the magneto-resistive sensor so that it operates at a point A, A' within the linear range of the sensors sensitivity curve (e.g. $\Delta R/R=1\%$). If a scale field X is added to the auxiliary field Y, then a quarter bridge is modulated to the point indicated with a circle, but the other quarter bridge is modulated only to the point indicated by a cross, since the two quarter bridges are spatially offset by half a graduation period P. Since the two quarter bridges by definition are interconnected to a half bridge, the difference between the two modulations is received as the output signal U1 or U2. The output signal U1 or U2 can be graphically generated by reflecting the auxiliary field, i.e., mirroring it, at the sensitivity curve of the sensors, as shown on the right of FIG. 6.

The output signals U1 and U2 can either be demodulated with the correct sign (+ or −) with a phase sensitive rectifier and be supplied as direct current signals to the customary interpolation circuits, or an evaluation circuit is employed in a conventional manner similar to that in resolver or synchronous converters.

If the auxiliary field Y is large compared to the scale field X and is chosen so that the operating point lies in the linear part of the sensitivity curve of the sensors 5, the output signal U1 or U2 to a large degree has the same chronological progression as the auxiliary field Y. This, however, is not a prerequisite for the function of the described arrangement.

Figure 7:
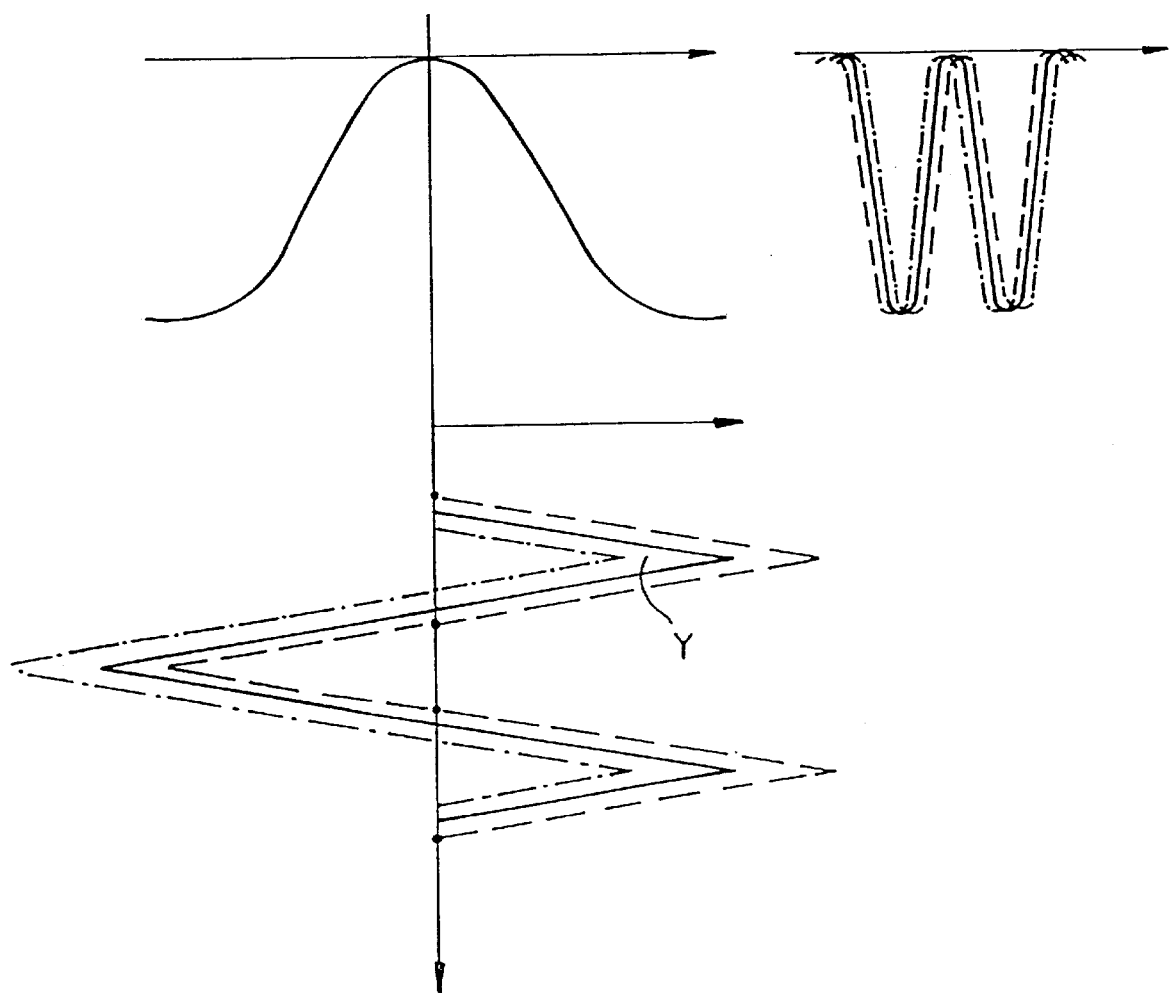
FIG. 7 shows a characteristic curve of a magneto-resistive element having signal progression when a triangular auxiliary field is applied.

FIG. 7 shows the signal progression of the output signal U1 or U2, when the auxiliary field Y has a triangular progression. Here it is also assumed that the auxiliary field Y modulates the sensors 5 to above saturation. The signal progression is produced once more by reflecting the fields at the sensitivity curve. The output signal U1 of a half bridge is the difference between the two quarter bridge signals and includes many odd-numbered harmonics besides the supply frequency. The evaluation can once more take place by means of phase sensitive rectifying, but other evaluation processes can also be carried out which deliberately use a harmonic. The auxiliary field Y can also have a purely sine-shaped progression.

Modulation with large auxiliary fields Y until saturation, or even beyond, has the advantage that the sensors 5 cannot be disrupted by external stray fields.

Figure 8:
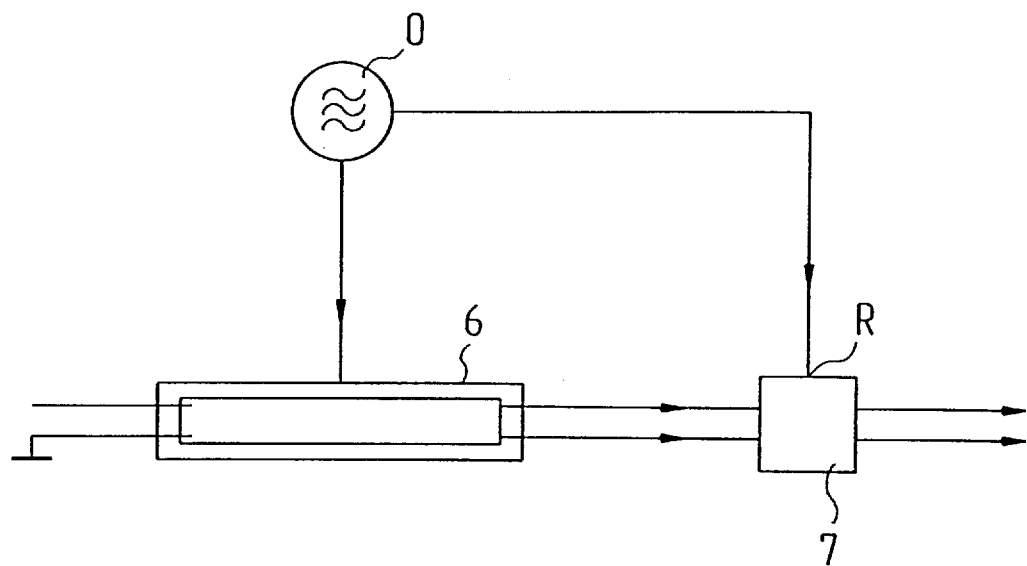
FIG. 8 is a block diagram.

FIG. 8 shows the block diagram for an evaluation similar to the one that is standard in resolvers. The oscillator 0 generates an alternating field preferably high frequency for the coil 6, simultaneously, the oscillator voltage contacts the reference input R of the evaluation device 7. Phase shifters, which are not shown here, can be additionally disposed between oscillator output and reference input R.

Figure 9:
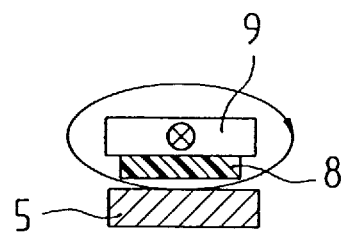
FIG. 9 shows sensors with current-carrying strips for generating the auxiliary field.

Instead of generating the auxiliary field Y with a coil, other devices can also be used for generating auxiliary fields. One possibility is shown for example in FIG. 9. Current carrying strips 9, which are separated from the sensor 5 by an insulating intermediate layer 8, are disposed in the immediate vicinity of the sensors 5.

Figure 10:
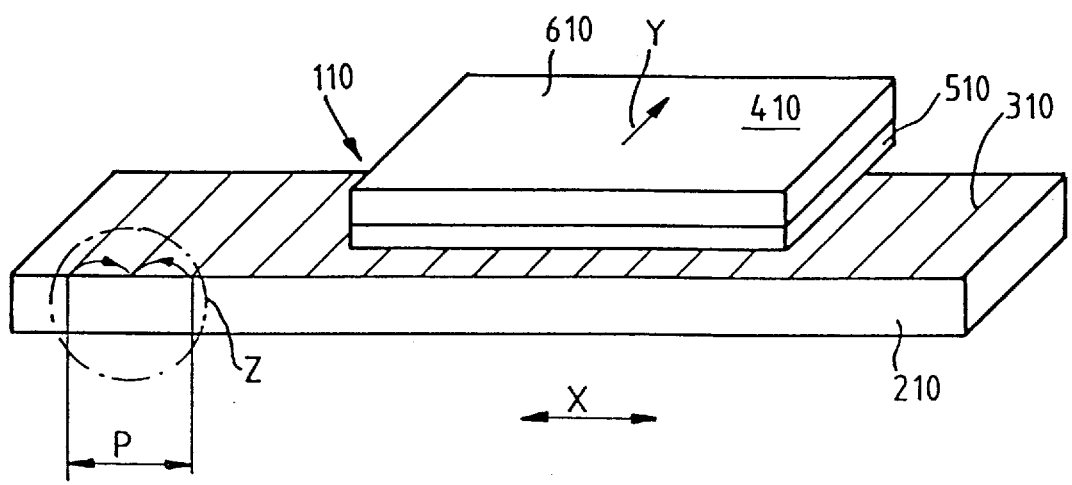
FIG. 10 is a perspective view of a position measuring device according to a preferred embodiment of the present invention.

FIG. 10 is a perspective view of a position measuring device according to a preferred embodiment of the present invention. In this preferred embodiment, the auxiliary field Y' acts parallely to the lengthwise extension of the sensor, i.e. in this case, perpendicularly to a component of the stray field caused by the magnetization of scale 2 and in a plane parallel to scale 2. The components of the measuring device are similar to that already described with reference to FIG. 1a. The same reference numerals with the addition of suffix 10 have been used to refer to similar components. The length measuring device 110 is essentially comprised of a scale 210 which has a periodic graduation 310 as well as of a scanner unit 410 for scanning the graduation 310. The scale 210 is comprised of magnetic material and is alternatingly magnetized with opposing field intensities thereby creating the periodic graduation 310 having the graduation period P. The magnetization is effected along the plane in which the scale 210 extends, but can also run perpendicular to it, which, however, is not shown here.

Figure 11:
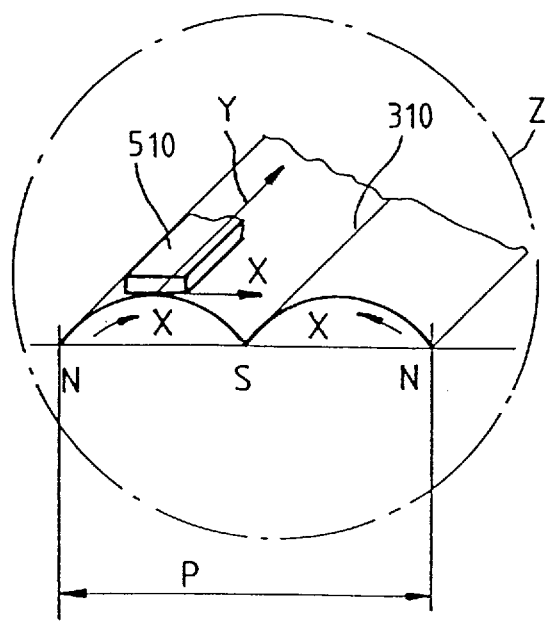
FIG. 11 is an exploded view of a section of the scale shown in FIG. 10 with a magneto-resistive element positioned thereabove according to a preferred embodiment of the present invention.

The magnetization generates a stray field—indicated as scale field X—which is symbolically depicted in the enlarged detail Z of FIG. 11.

The periodic graduation 310 is scanned by magnetic field sensitive elements 510, which are disposed in the scanner unit 410 and which will be described in further detail with respect to the Figures that follow. Reference numeral 510 is used for the one or more magnetic field sensitive elements.

The scanner unit 410, moreover, has a component 610, which generates a magnetic auxiliary field or also an external field Y', which is generated either electromagnetically or with permanent magnetism.

This external field Y' renders the scale field X momentarily ineffective with regard to the sensors 510. The scale field X can also be shielded with regard to the sensors 510 with the aid of a soft magnetic element.

Figure 12:
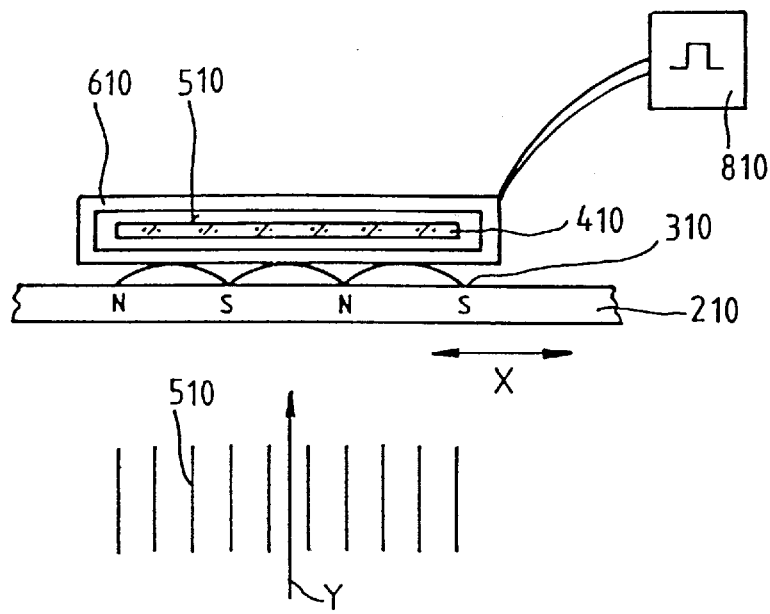
FIG. 12 shows a position measuring device with a magnetic auxiliary field.

FIG. 12 shows the scale 210 having the graduation 310, opposite to which is the scanner unit 410 with the sensors 510 for scanning the scale 210. The sensors 510 are encompassed by a coil 610 which generates a magnetic auxiliary field Y' with the aid of a pulse generator 810. This auxiliary field Y' is also indicated as an external field with regard to the magnetic field X of the graduation 310.

In the preferred embodiment illustrated, the external field Y' is disposed in the plane of the sensors 510—and parallel to the sensors 510.

Figure 13:
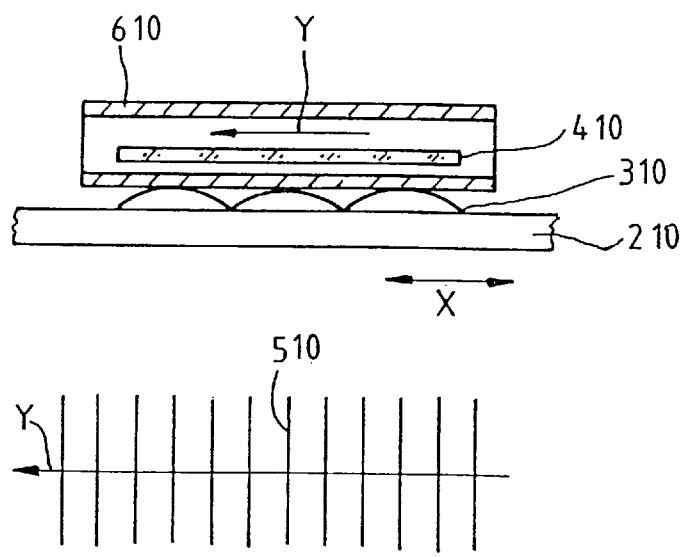
FIG. 13 shows a position measuring device with an auxiliary field directed differently.

FIG. 13 shows a similar configuration, but here, the external field Y' is oriented perpendicular to the sensors 510 as well as in their plane.

Figure 14:
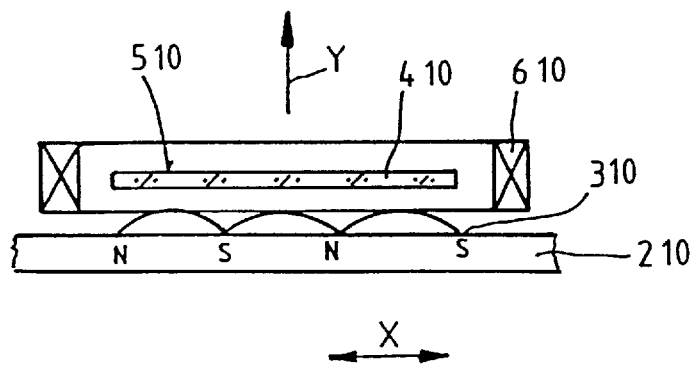
FIG. 14 shows a position measuring device with a vertical auxiliary field.

A further possibility—which does not exclude further variations—is shown in FIG. 14. Here, the external field Y extends perpendicularly to the plane in which the sensors 510 of the scanner unit 410 are disposed.

Figure 15:
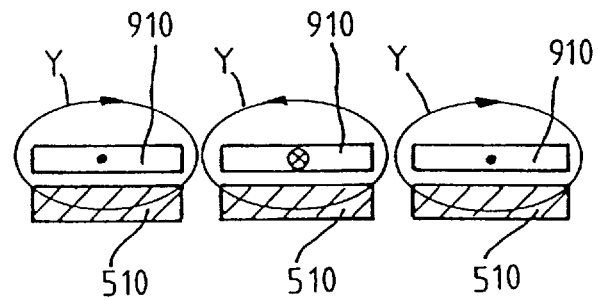
FIG. 15 shows a device for generating a magnetic auxiliary field.

In FIG. 15, the external field Y' can also be generated by current carrying strips 910, which are disposed in the immediate vicinity of the sensors 510. If the strips 910 carry current, the field generated by the current carrying strips drives the sensors 510 into saturation and thus interrupts the influence of the magnetic field X of the graduation 310. In FIG. 13, the orientation of the external field is carried out alternately, but similarly.

Figure 16:
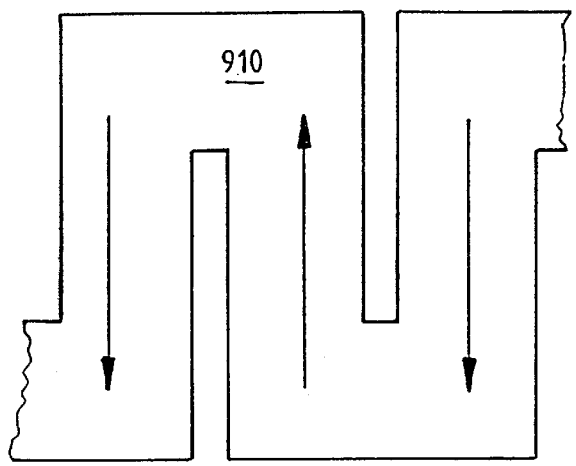
FIG. 16 shows a current-carrying strip for generating the auxiliary field of FIG. 15.

FIG. 16 shows a possible geometry of the current carrying strips 910.

Figure 17:
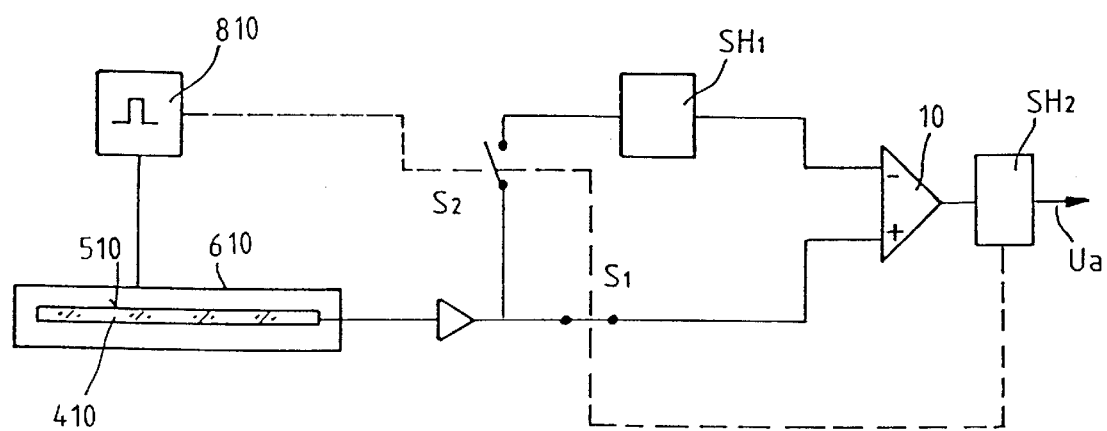
FIG. 17 illustrates a block diagram of the scanning unit and the electronics used to generate the auxiliary field Y or Y'.

FIG. 17 illustrates a block diagram of the scanning unit 410 and electronics used to generate the auxiliary field Y or Y'. The electronics include a pulse generator 810, a first switch $S_1$, a second switch $S_2$, a first sample and hold circuit $SH_1$, a second sample and hold circuit $SH_2$ and a differential amplifier 10. The pulse generator 810, by using a current or voltage surge, generates a momentary auxiliary magnetic field Y or Y' by means of a coil 610 current carrying 910. The external field Y or Y' must be large enough to drive the sensors 510 into saturation.

If the sensors 510 are in saturation, the stray scale field X no longer has an influence upon the sensors 510. Bridge zero points of a known bridge circuit are then determined solely by the ohmic zero resistors in the bridge branches.

The pulse generator 810 operates the first and second switches S1 and S2, which are alternatingly opened as illustrated.

In normal operation the first switch S1 is closed and the second switch S2 is open. At the same time as the auxiliary field Y or Y' is generated by the pulse generator 810 via the coil 610 on the sensor 510, the second switch S2 is closed and the first switch S1 is opened. The zero voltage now contacting the sensor 510 is stored in the first sample and hold circuit $SH_1$.

If the auxiliary field Y or Y' is switched off again, then with the second switch S2 is-open and the first switch S1 closed, the difference between the actual sensor voltage and zero voltage is output at the differential amplifier 10. The output voltage Ua of the differential amplifier 10 is thus independent of the zero drift of the sensor 510.

In order to prevent disruptions of the output signal Ua during the scanning phase, a second sample and hold circuit $SH_2$ is providable, which varies with the output signal of the sensor 510 and records the last actual signal voltage of the sensor 510 only during the active phase of the pulse generator 810.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A position measuring device for measuring the relative position of two objects which can be moved in relation to each other wherein a periodic, magnetic graduation in the measurement direction is scanned by a scanner unit comprising:
    at lease one magnetic field sensitive element for generating position-dependent output signals, from which position measuring values can be determined in an evaluation device, wherein the at least one magnetic field sensitive element is disposed in a plane parallel to the graduation; and
    means for momentarily rendering the magnetic field of the graduation ineffective, wherein the means for momentarily rendering the magnetic field of the graduation ineffective comprises:
    a pulse generator;
    a switching circuit controlled by the pulse generator including two switches which are alternately opened under control of the pulse generator;
    a coil coupled to the pulse generator for receiving pulses from the pulse generator and generating an auxiliary magnetic field to bias the magnetic field sensitive element:
    at least one sample and hold circuit coupled to the output of the differential amplifier; and
    a differential amplifier having one input coupled to the sample and hold circuit and the other input coupled to the magnetic field sensitive element and an output.

2. The position measuring device according to claim 1 wherein a magnetic auxiliary field momentarily drives the magnetic field sensitive elements into saturation and thus momentarily renders the magnetic field of the graduation ineffective.

3. The position measuring device according to claim 1 wherein the magnetic field of the graduation is shielded with regard to the magnetic field sensitive elements by at least one soft magnetic element.

4. The position measuring device according to claim 1 wherein the means for momentarily renders the magnetic field of the graduation ineffective comprises a magnetic external field that is larger than the saturation field intensity of the magnetic field sensitive elements.

5. The position measuring device according to claim 1 wherein the means for momentarily rendering the magnetic field of the graduation ineffective comprises a coil which is powered by a pulse generator.

6. The position measuring device according to claim 1 wherein the means for momentarily rendering the magnetic field of the graduation ineffective comprises a current carrying strip which is powered by a pulse generator.

7. The position measuring device according to claim 1 wherein the means for momentarily rendering the magnetic field of the graduation ineffective using permanent magnetism.

8. The position measuring device according to claim 1, wherein upon activation of the pulse generator, the auxiliary magnetic field is generated is rendered effective, a first switch is opened and a second switch is closed wherein the instantaneous voltage then contacting the sensor—usually the zero voltage—is stored in the sample and hold circuit, and upon deactivation of the pulse generator the conditions of the first and second switches and alternate, the actual voltage at the sensor is supplied to the differential amplifier, and is compared to the zero voltage, which is stored in the sample and hold circuit and likewise supplied to the differential amplifier, and at the output of the differential amplifier, a zero drift-free output voltage can be measured to constitute measurement values.

9. The position measuring device according to claim 8 wherein a further sample and hold circuit is provided in the switching circuit which is synchronized with the output signal of the sensor and stores the last actual signal voltage of the sensor only during the active phase of the pulse generator.

10. The position measuring device according to claim 1 wherein the magnetic field of the graduation is rendered momentarily ineffective before the measuring event.

11. The position measuring device according to claim 1 wherein the magnetic field of the graduation is rendered momentarily ineffective once more during the measuring event.

12. A position measuring device for measuring the relative position of two objects which are movable with respect to each other wherein a periodic graduation formed by magnetizing a pattern on a scale is scanned in a measuring direction by a scanning unit comprising:
    at least one magnetic field sensitive element for generating position dependent output signals from which position measurement values can be determined in an evaluation device, the magnetic field sensitive element disposed in a plane parallel to the periodic graduation, the magnetic field sensitive element having a saturation point, an evaluation device for providing position information from the detected signals; and
    an auxiliary magnetic field generator to magnetically bias the magnetic field sensitive element wherein the auxiliary magnetic field is a high frequency alternating field, said alternating magnetic field being generated by an oscillator, said oscillator generating a signal which is fed to a reference input of the evaluation unit.

13. The position measuring device according to claim 12 wherein the evaluation device is disposed in the scanner unit.

14. The position measuring device according to claim 12 wherein the position values are formed by phase sensitive rectifying the position-dependent output signals.

15. The position measuring device according to claim 12 wherein the position values are formed by means of interpolation with synchronous or resolver converters.

16. The position measuring device according to claim 12 wherein the auxiliary field is generated by current carrying strips which influence the at least one magnetic field sensitive elements.

17. The position measuring device according to claim 12 wherein the auxiliary field is generated by current carrying strips which influence the at least one magnetic field sensitive element via an insulating intermediate layer.

18. The position measuring device according to claim 12 wherein the at least one magnetic field sensitive element are disposed horizontally in a plane parallel to the periodic graduation.

19. The position measuring device according to claim 12 wherein the at least one magnetic filed sensitive element are disposed vertically in a plane parallel to the periodic graduation.

20. The position measuring device according to claim 12 wherein the magnetic field sensitive element is a flux-controlled resistor.

21. The position measuring device according to claim 12, wherein the magnetic field sensitive element is a magneto-resistive element.

22. The position measuring device according to claim 12 wherein the magnetic field of the graduation is rendered momentarily ineffective before the measuring event.

23. The position measuring device according to claim 12 wherein the magnetic field of the graduation is rendered momentarily ineffective once more during the measuring event.

* * * * *

UNITED STATES PATENT AND TRADEMARK OFFICE
CERTIFICATE OF CORRECTION

PATENT NO.     : 5,841,275
DATED          : November 24, 1998
INVENTOR(S)    : Alfons Spies It is certified that error appears in the above-identified patent and that said Letters Patent is hereby corrected as shown below:

On the Title Page

In column 1, item [73], please insert --Dr.-- before "Johannes".

In claim 1, line 23, after "element" please change ":" (colon) to --;-- (semicolon).

In claim 19, line 2, please change "filed" to --field--.

Signed and Sealed this

Twenty-seventh Day of March, 2001

Attest:

NICHOLAS P. GODICI

Attesting Officer

Acting Director of the United States Patent and Trademark Office